United States Patent [19]

Kioka et al.

[11] Patent Number: 5,015,612
[45] Date of Patent: May 14, 1991

[54] OLEFIN POLYMERIZATION CATALYST SUBJECTED TO PRELIMINARY POLYMERIZATION TREATMENT

[75] Inventors: Mamoru Kioka, Iwakuni; Masao Nakano, Yamaguchi; Kenji Doi; Akinori Toyota, both of Iwakuni, all of Japan

[73] Assignee: Mitsui Petrochemical Industries, Ltd., Tokyo, Japan

[21] Appl. No.: 407,437

[22] Filed: Sep. 14, 1989

[30] Foreign Application Priority Data

Sep. 14, 1988 [JP] Japan .................................. 63-231213
Sep. 14, 1988 [JP] Japan .................................. 63-231214

[51] Int. Cl.$^5$ ............................................. C08F 4/654
[52] U.S. Cl. ..................................... 502/133; 502/108; 502/121; 502/122; 502/123; 502/124; 502/125; 502/126; 502/127; 502/134; 526/125
[58] Field of Search ............... 502/108, 121, 122, 123, 502/124, 125, 126, 127, 133, 134

[56] References Cited

U.S. PATENT DOCUMENTS 4,295,991 10/1981 Wristers ........................... 502/108 X
4,780,443 10/1988 Matsuura et al. ............... 502/108 X
4,871,705 10/1989 Hoel ................................. 502/108 X

FOREIGN PATENT DOCUMENTS 2066274 7/1981 United Kingdom ................ 502/108

Primary Examiner—Patrick P. Garvin
Attorney, Agent, or Firm—Sherman and Shalloway

[57] ABSTRACT

An olefin polymerization catalyst component subjected to successive preliminary polymerization treatment using each of a straight chain alpha-olefin having 2 to 5 carbon atoms and 3-methyl-1-butene; an olefin polymerization catalyst using the olefin polymerization catalyst component; a process for polymerizing olefin(s) which comprises polymerizing or copolymerizing olefin(s) in the presence of the olefin polymerization catalyst; and a film and an injection-molded article of polypropylene which is prepared by the process are also provided.

9 Claims, No Drawings

OLEFIN POLYMERIZATION CATALYST SUBJECTED TO PRELIMINARY POLYMERIZATION TREATMENT

This invention relates to an olefin polymerization catalyst, a catalyst component thereof, and a process for polymerizing olefins using the catalyst, and a film or injection-molded article from the obtained polyolefin. More specifically, this invention relates to an olefin polymerization catalyst capable of giving in a high yield a polyolefin which is excellent in a see-through property and transparency in a form of a molded article, and at the same time has good properties, a catalyst component thereof and a process for preparing such a polyolefin by polymerizing olefin(s) in the presence of the catalyst, and a film or injection-molded article from the polyolefin.

Many proposals have already been made on the production of a solid titanium catalyst component containing as indispensable ingredients, magnesium, titanium, halogen and an electron donor, and it is known that by using such a solid titanium catalyst component in the polymerization of an alpha-olefin having at least 3 carbon atoms, a polymer having high stereoregularity can be prepared in high yield.

Further, it is known in preparation of a propylene series polymer using an olefin polymerization catalyst component consisting of such a solid titanium catalyst component as above-mentioned and an organoaluminum compound catalyst component that a propylene series polymer having an excellent see-through property can be obtained by preliminarily polymerizing 3-methyl-1-butene on the olefin polymerization catalyst component. It is conjectured that when 3-methyl-1-butene is preliminarily polymerized on the olefin polymerization catalyst component, poly(3-methyl-1-butene) acts as a polymer-nucleating agent in the propylene series polymer to miniaturize the spherulite size of polypropylene and thus the see-through property of the obtained propylene series polymer is enhanced.

However, there has been a problem that when propylene or propylene and another alpha-olefin are subjected to main polymerization after 3-methyl-1-butene is preliminarily polymerized using such an olefin polymerization catalyst component as above-mentioned, a part of particles of the obtained propylene series polymer is sometimes destroyed and finally powdery polymer is formed by this destruction.

Further, there has been a problem that a propylene series polymer obtained as above-mentioned has a small apparent bulk density due to the ununiform particle size.

An object of the invention is to provide an olefin polymerization catalyst giving a polyolefin which is excellent in a see-through property and has good particle properties.

Another object of the invention is to provide as an ingredient of the above catalyst of the invention a catalyst component which contains Mg, Ti, halogen and Al, and is subjected to successive preliminary polymerization using 3-methyl-1-butene and a straight chain alpha-olefin having 2 to 5 carbon atoms.

Still another object of the invention is to provide a process of preparing the above catalyst component of the invention.

A still further object of the invention is to provide a process of preparing in a high yield a polyolefin having an excellent see-through property and transparency in molded articles such as film and injection-molded article, and having good particle properties and moreover a large apparent density by polymerizing or copolymerizing olefin(s) in the presence of the above catalyst of the invention.

A still further object of the invention is to provide a film and an injection-molded article from the polyolefin having an excellent see-through property and transparency and good particle properties.

Still other objects and advantages of the invention will be clarified from the following description.

According to the invention, the above objects and advantages can be attained by an olefin polymerization catalyst subjected to preliminary polymerization treatment, which is formed by subjecting an olefin polymerization catalyst component (X), which is formed from (A) a solid titanium catalyst component containing magnesium, titanium, halogen and an electron donor as essential ingredients, (B) an organoaluminum compound catalyst component, and when desired, (C) an electron donor, to successive preliminary polymerization treatment using each of a straight chain alpha-olefin having 2 to 5 carbon atoms and 3-methyl-1-butene, and contains a polymerization unit of the straight chain alpha-olefin having 2 to 5 carbon atoms of 0.1 to 300 g and a polymerization unit of 3-methyl-1-butene of 0.1 to 100 g, per g of the solid part of the polymerization catalyst component (X), respectively.

According to the invention, the above olefin polymerization catalyst component can be formed either by (1) first preliminarily polymerizing a straight chain alpha-olefin having 2 to 5 carbon atoms in an amount of 0.1 to 300 g per g of the solid part of the polymerization catalyst component (X), using the olefin catalyst component (X) and then preliminarily polymerizing thereon 3-methyl-1-butene in an amount of 0.1 to 100 g per g of the solid part of the polymerization catalyst component (X), or by (2) first preliminarily polymerizing 3-methyl-1-butene in an amount of 0.1 to 100 g per g of the solid part of the polymerization catalyst component (X), using the solid part of the polymerization catalyst component (X) and then preliminarily polymerizing thereon a straight chain alpha-olefin having 2 to 5 carbon atoms in an amount of 0.1 to 300 g per g of the solid part of the polymerization catalyst component (X).

It should be understood in the invention that the term "polymerization" is sometimes used in a sense including copolymerization besides homopolymerization, and the term "polymer" is sometimes used in a sense including copolymer besides homopolymer.

An olefin polymerization catalyst component in the invention can be formed by subjecting an olefin polymerization catalyst component (X), which is formed from (A) a solid titanium catalyst component containing magnesium, titanium, halogen and an electron donor as essential ingredients, (B) an organoaluminum compound catalyst component, and when desired, (C) an electron donor, to the successive preliminary polymerization treatment of the above (1) or (2) using a straight chain alpha-olefin having 2 to 5 carbon atoms and 3-methyl-1-butene.

The olefin polymerization catalyst component of the invention contains the polymerization unit of the straight chain alpha-olefin having 2 to 5 carbon atoms in an amount of 0.1 to 300 g, preferably 0.1 to 100 g, more preferably 1 to 50 g, per g of the solid part of the polymerization catalyst component (X), and contains the polymerization unit of 3-methyl-1-butene in an amount of 0.1 to 100 g, preferably 1 to 50 g, more preferably 2 to 50 g, per g of the solid part of the polymerization catalyst component (X).

The olefin polymerization catalyst of the invention is formed from (I) the above olefin polymerization catalyst component of the invention (hereinafter referred also to as preliminary polymerization catalyst component), (II) an organoaluminum compound when desired, and (III) an electron donor when desired.

Respective components composing the above preliminary polymerization catalyst component and olefin polymerization catalyst are described below.

As already described, the preliminary polymerization catalyst component can be prepared by preliminary polymerizing a certain olefin using an olefin polymerization catalyst component (X) which is formed from a solid titanium catalyst component (A), an organoaluminum compound catalyst component (B) and, when desired, an electron donor (C).

The solid titanium catalyst component (A) used in the invention is a catalyst component of high activity which contains magnesium, titanium, halogen and an electron donor as indispensable ingredients.

Such a solid titanium catalyst component (A) can be prepared by making a magnesium compound, a titanium compound and an electron donor, respectively as mentioned below into contact.

As such titanium compounds may be mentioned, for example, tetravalent titanium compounds represented by $Ti(OR)_gX_{4-g}$ wherein R represents a hydrocarbon group, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(O\ iso-C_4H_9)Br_3$; dialkoxytitanium dihalides such as $Ti(OCH_3)_2Cl_2$, $Ti(OC_2H_5)_2Cl_2$, $Ti(O\ n-C_4H_9)_2Cl_2$ and $Ti(OC_2H_5)_2Br_2$; trialkoxytitanium monohalides such as $Ti(OCH_3)_3Cl$, $Ti(O\ n-C_4H_9)_3Cl$ and $Ti(OC_2H_5)_3Br$; and tetraalkoxytitanium such as $Ti(OCH3)4$, $Ti(OC_2H_5)_4$, $Ti(O\ n-C_4H_9)_4$, $Ti(O\ iso-C_4H_9)_4$ and $Ti(O\ 2\text{-ethylhexyl})_4$.

Among these are preferably used the halogen-containing titanium compounds, particularly titanium tetrahalide, more particularly titanium tetrachloride. These titanium compounds may be used singly or in a combination of two or more. They may be used as dilutions in hydrocarbon compounds or halogenated hydrocarbons.

As the magnesium compounds, any of the magnesium compounds having reducibility and magnesium compounds having no reducibility can be used.

The magnesium compounds used in the preparation of the solid titanium catalyst component may be, for example, a magnesium compound having reducibility and a magnesium having no reducibility.

The magnesium compound having reducibility may be, for example, a magnesium compound having a magnesium-carbon bond or a magnesium-hydrogen bond. Specific examples of the magnesium compound having reducibility include dimethyl magnesium, diethyl magnesium, dipropyl magnesium, dibutyl magnesium, diamyl magnesium, dihexyl magnesium, didecyl magnesium, decyl butyl magnesium, ethyl magnesium chloride, propyl magnesium chloride, butyl magnesium chloride, hexyl magnesium chloride, amyl magnesium chloride, butyl ethoxy magnesium, ethyl butyl magnesium and butyl magnesium halides. These magnesium compounds may be used as such or as a complex with an organoaluminum compound to be later described. These magnsium compound may be liquid or solid.

Specific examples of the magnsium compound having no reducibility include magensium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate.

The magnesium compound having no reducibility may be derived from the magnesium compound having reducibility. This derivation may be effected, for example, by contacting the magnesium compound having reducibility with such a compound as a polysiloxane compound, a halogen-containing silane compound, a halogen-containing aluminum compound, an ester or an alcohol.

Further, such a magnesium compound as above-mentioned may be used as a complex compound or double compound with another metal, or a mixture with another metal compound, or a mixture of these compounds.

In the present invention, the magnesium compounds having no reducibility are preferred, and halogen-containing magnesium compounds are especially preferred. Above all, magnesium chloride, alkoxy magnesium chlorides and aryloxy magnesium chlorides are particularly advantageously used.

Further, as the electron donor, polycarboxylic acid esters may preferably be used, and specifically compounds having the skeletons represented by the following formulae are mentioned:

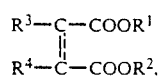

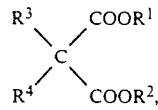

and

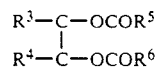

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, ══represents a single bond or a double bond, at least one of $R^3$ and $R^4$ is preferably a substituted or unsubstituted hydrocarbon group, and $R^3$ and $R^4$ may be linked to each other to form a cyclic structure.

Examples of the substituted hydrocarbon groups for $R^1$ through $R^5$ are hydrocarbon groups having substituents containing hetero atoms such as N, O and S, for example, —C—O—C—, —COOR, —COOH, —OH, —SO$_3$H, —C—N—C— and —NH$_2$.

Among them are preferred diesters of dicarboxylic acids wherein at least one of $R^1$ and $R^2$ is an alkyl group having at least two carbon atoms.

Specific examples of polycarboxylic acid esters include aliphatic polycarboxylic acid esters such as diethyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, diisooctyl maleate, diisobutyl maleate, diisobutyl butylmaleate, diethyl butylmaleate, diisopropyl beta-methylglutarate, diallyl ethylsuccinate, di-2-ethylhexyl fumarate, diethyl itaconate, diisobutyl itaconate, diisooctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and nadic acid diethyl ester; aromatic polycarboxylic acid esters such as monoethyl phthalate, dimethyl phthalate, methylethyl phthalate, monoisobutyl phthalate, n-butyl phthalate, diethyl phthalate, ethylisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, didecyl phthalate, benzylbutyl phthalate, diphenyl phthalate, diethyl naphthlenedicarboxylate, dibutyl naphthlenedicarboxylate, triethyl trimellitate and dibutyl trimellitate; and heterocyclic polycarboxylic acid esters such as 3,4-furanedicarboxylic acid esters.

Other examples of polycarboxylic acid esters include esters of long-chain dicarboxylic acids such as diethyl adipate, diisobutyl adipate, diisopropyl sebacate, di-n-butyl sebacate, di-n-octyl sebacate and di-2-ethylhexyl sebacate.

Among these polycarboxylic acid esters, compounds having the skeletons given by the above general formulae are preferred. More preferred are esters formed between phthalic acid, maleic acid or substituted malonic acid and alcohols having at least 2 carbon atoms, diesters formed between phthalic acid and alcohols having at least 2 carbon atoms are especially preferred.

These polycarboxylic acid esters may not always be in the form of polycarboxylic acid esters at the starting stage, and may optionally be formed in the preparation stage of the solid titanium catalyst components (A) from compounds capable of being converted into these polycarboxylic acid esters.

As electron donors other than polycarboxylic acids which can be used in preparation of solid titanium catalysts (A) are usable hereinafter described alcohols, amines, amides, ethers, ketones, nitriles, phosphines, stibines, arsins, phosphoryl amides, esters, thioethers, thioesters, acid anhydrides, acid halides, aldehydes, alcoholates, organosilicon compounds such as alkoxy- (or aryloxy)silanes, organic acids, amides and salts of metals of groups I to IV of the periodic table, etc.

In the present invention, the solid titanium catalyst component (A) may be produced by contacting the above magnesium compound (or metallic magnesium), the electron donor and the titanium compound. Known methods used to prepare a highly active titanium catalyst component from a magnesium compound, a titanium compound and an electron donor may be adopted in preparation of the solid titanium catalyst component (A). The above compounds may be contacted in the presence of another reaction agent such as silicon, phosphorus or aluminum.

(1) A method wherein either a magnesium compound and a titanium compound, or a titanium compound and a complex compound of a magnesium compound with an electron donor are reacted in a liquid phase. This reaction may be carried out in the presence of a pulverizing agent or the like. Compounds which are solid may be pulverized before the reaction. Further, each ingredient may preliminarily be treated before the reaction with an electron donor and/or a reaction acid such as an organoaluminum compound or halogen-containing silicon compound. The above electron donor is used at least once in this method.

(2) A method wherein a liquid magnesium compound having no reducibility and a liquid titanium compound are reacted in the presence of the electron donor to deposit a solid titanium composite.

(3) A method wherein the reaction product obtained in (2) is further reacted with the titanium compound.

(4) A method wherein the reaction product obtained in (1) or (2) is further reacted with the electron donor and the titanium compound.

(5) A method wherein the magnesium compound or a complex of the magnesium compound and the electron donor is pulverized magnesium compound and the electron donor is pulverized in the presence of the titanium compound, and the resulting solid product is treated with a halogen, a halogen compound or an aromatic hydrocarbon. In this method, the magnesium compound or the complex of it with the electron donor may also be pulverized in the presence of a pulverizing agent, etc. Alternatively, the magnesium compound or the complex of the magnesium compound and the electron donor is pulverized in the presence of the titanium compound, preliminarily treated with a reaction aid and thereafter, treated with halogen, etc. The reaction aid may be an organoaluminum compound or a halogen-containing silicon compound. The electron donor is at least once used in this method.

(6) A method wherein the product obtained in (1) to (4) is treated with a halogen, a halogen compound or an aromatic hydrocarbon.

(7) A method wherein a product obtained by contacting a metal oxide, dihydrocarbyl magnesium and a halogen-containing alcohol is contacted with the electron donor and the titanium compound.

(8) A method wherein a magnesium compound such as a magnesium salt of an organic acid, an alkoxy magnesium or an aryloxy magnesium is reacted with the electron donor, the titanium compound and/or a halogen-containing hydrocarbon.

(9) A method wherein the catalyst component in a hydrocarbon solution at least containing the magnesium compound, and an alkoxy titanium and/or an electron donor such as an alcohol or ether is reacted with the titanium compound and/or a halogen-containing compound such as a halogen-containing silicon compound, in any one of steps of this method such an electron donor as above-mentioned represented by phthalic diesters being made to coexist.

Among the methods (1) to (9) cited above for the preparation of the solid titanium catalyst component (A), the method in which the liquid titanium halide is used at the time of catalyst preparation, and the method in which the halogenated hydrocarbon is used after, or during, the use of the titanium compound are preferred.

The amounts of the ingredients used in preparing the solid titanium catalyst component (A) may vary depending upon the method of preparation. For example, about 0.01 to 5 moles, preferably 0.05 to 2 moles, of the electron donor and about 0.01 to 500 moles, preferably about 0.05 to 300 moles, of the titanium compound are used per mole of the magnesium compound.

The solid titanium catalyst component (A) so obtained contains magnesium, titanium, halogen and the electron donor as essential ingredients.

In the solid titanium catalyst component (A), the atomic ratio of halogen/titanium is about 4 to 200, preferably about 5 to 100; the electron donor/titanium mole ratio is about 0.1 to 10, preferably about 0.2 to 6; and the magnesium/titanium atomic ratio is about 1 to 100, preferably about 2 to 50.

The resulting solid titanium catalyst component (A) contains a magnesium halide of a smaller crystal size than commercial magnesium halides and usually has a specific surface area of at least about 50 m$^2$/g, preferably about 60 to 1,000 m$^2$/g, more preferably about 100 to 800 m$^2$/g. Since, the above ingredients are unified to form an integral structure of the solid titanium catalyst component (A), the composition of the solid titanium catalyst component (A) does not substantially change by washing with hexane.

The solid titanium catalyst component (A) may be used alone. If desired, it can be used after being diluted with an inorganic or organic compound such as a silicon compound, an aluminum compound or a polyolefin. When such a diluent is used, the catalyst component (A) show high catalystic activity even when it has a lower specific surface than that described above.

Methods of preparing the highly active catalyst component, which can be used in this invention, are described in Japanese Laid-Open Patent Publications Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1977, 138706/1983, 138707/1983, 138708/1983, 138709/1983, 138710/1983, 138715/1983, 23404/1985, 21109/1986, 37802/1986 and 37803/1986.

Compounds having at least one aluminum-carbon bond in the molecule can be used as the organoaluminum compound as catalyst component (B). Examples are compounds of the following general formulae (i) and (ii).

(i) Organoaluminum compounds of the general formula $$R_m^7Al(OR^8)_nH_pX_q^1$$

In the general formula, $R^7$ and $R^8$ may be identical or different, and each represents a hydrocarbon group usually having 1 to 15 carbon atoms, preferably 1 to 4 carbon atoms; $X^1$ represents a halogen atom, $0 < m \leq 3$, $0 \leq n < 3$, $0 \leq p < 3$, $0 \leq q < 3$, and $m+n+p+q=3$.

(ii) Complex alkylated compounds between aluminum and a metal of Group I represented by the general formula $$M^1AlR_4^7$$

wherein $M^1$ represents Li, Na or K, and $R^7$ is as defined above. Examples of the organoaluminum compounds of general formula (i) are as follows: Compounds of the general formula $$R_m^7Al(OR^8)_{3-m}$$

wherein $R^7$, $R^8$ and m are as defined, and m is preferably a number represented by $1.5 \leq m \leq 3$. Compounds of the general formula $$F_m^7AlX_{3-m}$$

wherein $R^7$, X and m are as defined and m is preferably a number represented by $0 < m < 3$. Compounds of the general formula
$$R_m^7AlH_{3-m}$$

wherein $R^7$ and m are as defined above, and m is preferably a number represented by $2 \leq m < 3$. Compounds represented by the general formula $$F_m^7Al(OR^8)_nX_1 \text{ ps}$$

wherein $R^7$, $R^8$, m, n and q are as defined above.

Specific examples of the organoaluminum compounds belonging to (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^7Al(OR^8)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds similar to (i) in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$, $$(C_2H_5)_2AlNAl(C_2H_5)_2$$
$$|$$
$$C_2H_5$$

and methylaluminoxane.

Examples of the compounds belonging to (ii) are $LiAl(C_2H_5)_4$ and $LiAl(C_7H_{15})_4$.

Among these, the trialkyl aluminums and the alkyl aluminums resulting from bonding of the two or more of the above aluminum compounds are preferred.

In preparation of the olefin polymerization catalyst component in the invention, an electron donor (C) may be used if desired. Examples of such electron donors (C) include oxygen-containing electron donors such as alcohols, phenols, ketones, aldehydes, carboxylic acids, esters of organic or inorganic acids, ethers, acid amides, acid anhydrides and alkoxysilanes; nitrogen-containing electron donors such as ammonia, amines, nitriles and isocyanates; the above polycarboxylic acid esters; etc.

Specific examples of electron donors (C) include alcohols having 1 to 18 carbon atoms such as methanol, ethanol, propanol, pentanol, hexanol, octanol, dodecanol, octadecyl, alcohol, oleoyl alcohol, benzyl alcohol, phenylethyl alcohol, cumyl alcohol, isopropyl alcohol and isopropylbenzyl alcohol; phenols having 6 to 20 carbon atoms and optionally having a lower alkyl group such as phenol, cresol, xylenol, ethylphenol, propylphenol, nonylphenol, cumylphenol and naphthol; ketones having 3 to 15 carbon atoms such as acetone, methyl ethyl ketone, methyl isobutyl ketone, acetophenone, benzophenone and benzoquinone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisurate, n-butyl maleate, diisobutyl methylmalonate, di-n-hexyl cyclohexanecarboxylate, diethyl nadate, diisopropyl tetrahydrophthalate, diethyl phthalate, diisobutyl phthalate, di-n-butyl phthalate, di-2-ethylhexyl phthalate, gamma-butyrolactone, deltavalerolactone, coumarin, phthalide and ethylene carbonate; acid halides having 2 to 15 carbon atoms such as acetyl chloride, benzoyl chloride, toluyl chloride and anisuryl chloride; ethers and diethers having 2 to 20 carbon atoms such as methyl ether, ethyl ether, isopropyl ether, butyl ether, amyl ether, tetrahydrofuran, anisole, diphenyl ether and epoxy-p-menthane; acid amides such as acetamide, benzamide and toluamide; amines such as methylamine, ethylamine, diethylamine, tributylamine, piperidine, tribenzylamine, aniline, pyridine, picoline and tetramethylenediamine; nitriles such as acetonitrile, benzonitrile and tolunitrile; acid anhydrides such as acetic anhydride, phthalic anhydride and benzoic anhydride; etc.

As the electron donor (C) are also usable organosilicon compounds represented by the following general formula (Ia)

$$R_r^9Si(OR^{10})_{4-r} \qquad (Ia)$$

wherein $R^9$ and $R^{10}$ are hydrocarbon groups and $0 < r < 4$.

Specific examples of the organosilicon compounds of the general formula (Ia) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltoluethoxysilane, ethyltriethoxysilane, vinyltriethoxysilane, t-butyltriethoxysilane, n-butyltriethoxysilane, isobutyltrimethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxy)silane, vinyltriacetoxysilane, dimethyltetraethoxydisiloxane, etc.

Among them are preferred trimethylmethoxysilane, ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

Further, as electron donor (C) are also usable organosilicon compounds represented by the following general formula (IIa)

$$SiR^{11}R_s^{12}(OR^{13})_{3-s} \qquad (IIa)$$

wherein $R^{11}$ is a cyclopentyl group or a cyclopentyl group having an alkyl group, $R^{12}$ is a group selected from the group consisting of an alkyl group, a cyclopentyl group and a cyclopentyl group having an alkyl group, $R^{13}$ is a hydrocarbon group, and s is a number of $0 \leq s < 2$.

As above defined, $R^{11}$ in the above formula (IIa) is a cyclopentyl group or a cyclopentyl group having an alkyl group, and examples of $R^{11}$ include, for example, a cyclopentyl group and alkyl-substituted cyclopentyl groups such as 2-methylcyclopentyl, 3-methylcyclopentyl, 2-ethylcyclopentyl and 2,3-dimethylcyclopentyl groups.

Further, $R^{12}$ in the formula (IIa) is an alkyl group, a cyclopentyl group or a cyclopentyl group having an alkyl group, and examples of $R^{12}$ include, for example, alkyl groups such as methyl, ethyl, propyl, isopropyl, butyl and hexyl groups, and cyclopentyl group and alkylsubstituted cyclopentyl groups as exemplified as $R^{11}$.

Further, $R^{13}$ in the formula (IIa) is a hydrocarbon group, and examples of $R^{13}$ include, for example, hydrocarbon groups such as alkyl, cycloalkyl, aryl and aralkyl groups.

It is preferred to use among them organosilicon compounds wherein $R^{11}$ is a cyclopentyl group, $R^{12}$ is an alkyl or cyclopentyl group, and $R^{13}$ is an alkyl group, especially a methyl or ethyl group.

Specific examples of the organosilicon compound include trialkoxysilanes such as cyclopentyltrimethoxysilane, 2-methylcyclopentyltrimethoxysilane, 2,3- dimethylcyclopentyltrimethoxysilane and cyclopentyltriethoxysilane; dialkoxysilanes such as dicyclopentyldiethoxysilane, bis(2-methylcyclopentyl)dimethoxysilane, bis-(2,3-dimethylcyclopentyl)dimethoxysilane and dicyclopentyldiethoxysilane; monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane, etc.

As the electron donor (C), the above organic carboxylic acid esters and the organosilicon compounds are preferred, and the organosilicon compounds are particularly preferred.

The preliminary polymerization catalyst component (I) of the invention is prepared by subjecting the olefin polymerization catalyst component (X) formed from the above solid titanium catalyst component (A), the organoaluminum compound catalyst component (B) and when desired the electron donor (C) to successive preliminary polymerization treatment using a straight chain alpha-olefin having 2 to 5 carbon atoms and 3-methyl-1-butene. As already mentioned, the preliminary polymerization treatment is carried out either by first using the straight chain alpha-olefin having 2 to 5 carbon atoms and then 3-methyl-1-butene or by first using 3-methyl-1-butene and then the straight chain alpha-olefin having 2 to 5 carbon atoms.

In either preliminary polymerization treatment, the straight chain alpha-olefin having 2 to 5 carbon atoms is used in an amount of 0.1 to 300 g, preferably 1 to 100 g, particularly preferably 1 to 50 g, per g of the solid part of the polymerization catalyst component (X), and 3-methyl-1-butene is used in an amount of 0.1 to 100 g, preferably 1 to 50 g, particularly preferably 2 to 50 g, per g of the solid part of the polymerization catalyst component (X).

Specific examples of the straight chain alpha-olefin having 2 to 5 carbon atoms include ethylene, propylene, n-butene-1 and n-pentene-1.

In the preliminary polymerization, the catalyst can be used in a concentration rather higher than the catalyst concentration in the main polymerization system.

It is desirable to arrange the concentration of the solid titanium catalyst component (A) in the preliminary polymerization in a range of usually about 0.01 to 200 millimoles, preferably about 0.1 to 100 millimoles, particularly preferably 1 to 50 millimoles, in terms of titanium atom per liter of the later-described inactive hydrocarbon solvent.

The amount of the organoaluminum catalyst component (B) may be an amount such that 0.1 to 500 g, preferably 0.3 to 300 g, of the polymer is formed per g of the solid titanium catalyst component (A). It is desirable that the amount is an amount of usually about 0.1 to 500 moles, preferably about 1 to 100 moles, per mole of the titanium atom in the solid titanium catalyst component (A).

The electron donor (C) is used according to necessity, and it is preferred to use it in an amount of 0.1 to 100 moles, preferably 1 to 50 moles, particularly preferably 1 to 10 moles, per mole of the titanium atom in the solid titanium catalyst component (A).

The preliminary polymerization is preferably carried out under a mild condition with addition of the olefin and the above catalyst components to an inert hydrocarbon medium.

Examples of the inert hydrocarbon medium to be used include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; and halogenated hydrocarbons such as ethylene chloride and chlorobenzene; and their mixtures; etc. Aliphatic hydrocarbons are particularly preferably used among these inert hydrocarbon medium. It is also possible to use the monomer itself as a solvent or to preliminary polymerize the monomer in a state substantially free of a solvent.

The reaction temperature for the preliminary polymerization may be one at which the resulting preliminary polymer does not substantially dissolve in the inert hydrocarbon medium. Desirably, it is usually about $-20°$ to $+100°$ C., preferably about $-20°$ to $+80°$ C., more preferably $0°$ to $+40°$ C.

A molecular weight-controlling agent such as hydrogen may be used in the preliminary polymerization. Desirably, the molecular weight-controlling agent is used in such an amount that the polymer obtained by the preliminary polymerization has an intrinsic viscosity $[\eta]$, measured in decalin at $135°$ C., of at least about 0.2 dl/g, preferably about 0.5 to 10 dl/g.

The preliminary polymerization may be carried out batchwise or continuously. Further, batchwise and continuous methods may be used together. For example, it is possible to carry out batchwise the preliminary polymerization treatment with the 3-methyl-1-butene and then continuously the preliminary polymerization treatment with the straight chain alpha-olefin having 2 to 5 carbon atoms.

By thus subjecting the olefin polymerization catalyst component (X) either to preliminary polymerization treatment using first the straight chain alpha-olefin having 2 to 5 carbon atoms and then 3-methyl-1-butene, or to preliminary polymerization treatment using first 3-methyl-1-butene and then the straight chain alpha-olefin having 2 to 5 carbon atoms, a polymer composition consisting of the polymerization unit of the straight chain alpha-olefin having 2 to 5 carbon atoms and that of 3-methyl-1-butene is formed on the olefin polymerization catalyst component (X).

According to the invention is similarly provided an olefin polymerization catalyst formed from
(I) the olefin polymerization catalyst component of the invention obtained by the above preliminary polymerization treatment,
(II) when desired, an organoaluminum compound catalyst component, and
(III) when desired, an electron donor.

As the organoaluminum compound component (II), the same compounds as the organoaluminum compounds used in preparation of the preliminary polymerization catalyst component can be used. Further, there can similarly be used as the electron donor (III) the same compounds as the electron donors used in preparation of the preliminary polymerization catalyst component.

However, this does not mean to make it indispensable to use the same compounds as used in preparation of the preliminary polymerization catalyst component as the organoaluminum compound catalyst component (II) and the electron donor (III), respectively.

According to the invention, a polymerization method which comprises polymerizing or copolymerizing an olefin in the presence of the olefin polymerization catalyst of the invention is also provided.

Examples of the olefin to be used in such main polymerization include olefins having 3 to 20 carbon atoms such as propylene, 1-butene, 4-methyl-1-pentene and 1-octene. In the process of this invention, these olefins may be used singly or in combination. In one preferred embodiment of the invention, propylene or 1-butene is homopolymerized, or a mixed olefin containing propylene or 1-butene as a main component is copolymerized. When the mixed olefin is used, the content of propylene or 1-butene as the main component is usually at least 50 mole %, preferably at least 70 mole %. When the copolymerization is carried out using a mixed olefin, it is possible to use ethylene as a comonomer.

In the homopolymerization or copolymerization of these olefins, a polyunsaturated compound such as a conjugated diene or a non-conjugated diene may be used as a comonomer.

In the polymerization process of this invention, the main polymerization of an olefin is carried out usually in the gaseous or liquid phase.

When the main polymerization is carried out in a slurry reaction mode, the aforesaid inert hydrocarbon may be used as a reaction solvent. Alternatively, an olefin which is liquid at the reaction temperature may alternatively be used as the reaction solvent.

In the polymerization process of the invention, the olefin polymerization catalyst component (2) obtained by the preliminary polymerization is used in an amount of usually about 0.001 to 0.5 millimole, preferably about 0.005 to 0.1 millimole, calculated as Ti atom per liter of the volume of the polymerization zone. The organoaluminum compound catalyst component (II) is used in an amount such that the amount of the metal atom in the organoaluminum compound catalyst component is usually about 1 to 2,000 moles, preferably about 5 to 500 moles, per mole of the titanium atom in the olefin polymerization catalyst component in the polymerization system. Further, the electron donor (III) is used in an amount of usually about 0.001 to 10 moles, preferably about 0.01 to 2 moles, particularly preferably about 0.05 to 1 mole, per mole of the metal atom in the organoaluminum compound catalyst component (II).

The use of hydrogen at the time of main polymerization makes it possible to control the molecular weight of the resulting polymer, and the polymer obtained has a high melt flow rate. In this case, too, the stereoregularity index of the resulting polymer and the activity of the catalyst are not decreased in the polymerization process of this invention.

It is advantageous that the polymerization temperature of the olefin in the invention is usually about 20° to 200° C., preferably about 50° to 100° C., and the polymerization pressure is usually from atmospheric pressure to 100 kg/cm², preferably about 2 to 50 kg/cm². The main polymerization may be carried out batchwise, semi-continuously or continuously. The polymerization may also be carried out in two or more stages under different reaction conditions.

The olefin polymer obtained by the process of the invention may be a homopolymer, a random copolymer or a block copolymer. The content of the 3-methyl-1-butene polymerization unit in the olefin polymer is usually 10 to 10,000 wt. ppm, preferably 100 to 3,000 wt. ppm, more preferably 100 to 1,000 wt. ppm.

When particularly polymerization of propylene or copolymerization of propylene with another alpha-olefin is carried out in the above manner either using the olefin polymerization catalyst component of the invention containing the 3-methyl-1-butene polymerization unit and the polymerization unit of the straight chain alpha-olefin having 2 to 5 carbon atoms as a result of the preliminary polymerization, or using the olefin polymerization catalyst of the invention formed from this catalyst component, the organoaluminum compound (II) when desired, and the electron donor (III) when desired, a propylene series polymer having an excellent see-through property, good properties and a large apparent bulk density can be obtained.

That is to say, when polymerization of propylene or copolymerization of propylene with another alpha-olefin is carried out using the olefin polymerization catalyst component prepared by the invention, the polymerization composition in the resulting propylene series polymer comprising the 3-methyl-1-butene polymerization unit and the polymerization unit of the straight chain alpha-olefin having 2 to 5 carbon atoms makes the size of the spherulites of the propylene series polymer to be miniaturized, and as a result the resulting propylene series polymer is excellent in a see-through property. Further, the propylene series polymer obtained using the olefin polymerization catalyst component, wherein the 3-methyl-1-butene polymerization unit and the polymerization unit of the straight chain alpha-olefin having 2 to 5 carbon atoms are contained as a result of the preliminary polymerization, is superior to a propylene series polymer obtained using an olefin polymerization catalyst component wherein only 3-methyl-1-butene is preliminarily polymerized in that particles of the resulting polymer are less destroyed, it is possible to suppress the formation of finely powdery polymer and moreover the resulting propylene series polymer has a higher apparent bulk density.

Further, since the yield of the polymer having stereoregularity based on the unit amount of the olefin polymerization catalyst component (X) is high in the invention, it is possible to relatively reduce the catalyst residue, especially halogen content in the polymer. As a result, not only it is possible to omit a procedure of removing the catalyst in the polymer, but when a molded article is made using the formed olefin polymer, occurrence of rust on the metal mold can effectively be suppressed.

According to the invention are also provided a nonstretched film of polypropylene which is prepared by polymerizing propylene in the presence of the olefin polymerization catalyst of the invention in the above manner and contains 3-methyl-1-butene polymerization unit in a content of 10 to 10,000 wt. ppm, a stretched film obtained by stretching the nonstretched polypropylene film and an injection-molded article made of the polypropylene.

These products are described below in this order.

The nonstretched film can be prepared by molding the above polypropylene (hereinafter referred to as the 3-methyl-1-butene polymerization unit-containing composition) into a film according to the known molding method such as extrusion-molding or injection-molding.

The molding temperature may be at least the temperature at which the 3-methyl-1-butene polymerization unit-containing composition becomes a melted state, and it is desirable to carry out the molding by heating the composition to a temperature of usually 190° to 300° C., preferably 210° to 280° C.

The thus molded nonstretched film of the invention has a thickness of usually 10 micrometers to 0.3 mm, preferably 20 micrometers to 0.2 mm.

In a usual composition which is prepared by merely mixing poly(3-methylene-1-butene), polypropylene and the like and contains the 3-methyl-1-butene polymer, poly(3-methyl-1-butene), polypropylene and the like are not uniformly blended to a state such that both ingredients are mixed in a molecular level as in the case in the above 3-methyl-1-butene polymerization unit-containing composition. It has been very difficult to prepare a nonstretched film having high transparency in use of such a usual composition.

It is surmised in the invention that by use of the above 3-methyl-1-butene polymerization composition the spherulite size of the propylene series polymer is miniaturized and at the same time the crystallization speed of the propylene polymerization unit is accelerated whereby the transparency of the obtained nonstretched film is enhanced. That is to say, it is surmised that by use of the 3-methyl-1-butene polymerization unit-containing composition the nonstretched film of the invention having high transparency is obtained as a result of miniaturization of the spherulite size of the propylene series polymer and remarkable enhancement of crystallization speed.

The nonstretched film of the invention has the above thickness and thus the films of the invention include sheet-like film.

Since the 3-methyl-1-butene polymerization unit-containing composition contains the 3-methyl-1-butene polymerization unit as a polymer nucleus in the above amount, the crystallization speed thereof is fast. Thus, it is possible to shorten the molding cycle by use of this tight composition.

The stretched film of the invention can be obtained by stretching the thus obtained nonstretched film to at least one direction of longitudinal direction and transverse direction. Thus the stretched film of this invention includes both uniaxially stretched film and biaxially stretched film.

It is desirable that the stretching temperature of the above nonstretched film is usually 130° to 200° C., preferably 140° to 190° C. When the stretched film of the invention is a biaxially stretched film, the stretching magnification in the above condition is usually 20 to 70 times, preferably 40 to 60 times, and in case of a uniaxially shortened film the stretching magnification in the above condition is usually 2 to 10 times, preferably 2 to 6 times.

Further, besides biaxially or uniaxially stretched film obtained by stretching in the above manner the prepared nonstretched film, the stretched film of the invention can also be obtained by the inflation method wherein the 3-methyl-1-butene polymerization unit-containing composition in a melted state is stretched while a gas such as air is blown therein. The stretching magnification in this case is arranged in a range of usually 4 to 50 times, preferably 9 to 16 times.

The thus obtained stretched film of the invention is excellent especially in a see-through property. As is clearly described, it is surmised that this is because the 3-methyl-1-butene polymerization unit contained in this composition makes the spherulite size of the propylene series polymer to be miniaturized and at the same time makes the crystallization speed of polypropylene faster.

The 3-methyl-1-butene polymerization unit-containing composition of the invention has fast crystallization speed, and thus allows the preparation cycle of the stretched film to be shortened.

The injection-molded article of the invention can be prepared by injection-molding through heating the 3-methyl-1-butene polymerization unit-containing composition to a molding temperature of at least the temperature bringing about its melted state, namely to a temperature of usually 190° to 300° C. preferably 210° to 280° C.

Since the above 3-methyl-1-butene polymerization unit-containing composition of the invention has a remarkably fast crystallization speed as is above-mentioned, and as a result the composition gives the injection-molded article of the invention having a high transparency.

Various stabilizers can be compounded in the above composition of the invention for preparation of the above nonstretched film, stretched film and injection-molded article of the invention.

Compounding of a phenol type stabilizer is preferred since a film and an injection-molded article which are excellent in thermal resistance and heat stability, and transparency are obtained thereby, and compounding of both a phenol type stabilizer and an organophosphite stabilizer is further preferred since a film and an injection-molded article particularly excellent in thermal resistance and heat stability, and transparency are obtained.

Further, when a higher fatty acid metal salt is compounded, the heat stability of the resin at molding is enhanced and its moldability is improved and at the same time troubles accompanying occurrence of rust and corrosion on and of the molding machine due to the halogen gas from the catalyst can be suppressed. Use of a phenol type stabilizer and/or an organophosphite stabilizer as the aforesaid stabilizer with the higher fatty acid metal salt at the same time is preferred because an excellent synergistic effect is accomplished thereby in moldability, and the transparency and thermal resistance of the obtained film and injection-molded article.

Specific examples of the phenol type stabilizer include 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-d-t-octyl-4-n-propylphenol, 2,6-dicyclohexyl-4-n-octylphonel, 2-isopropyl-4-methyl-6-t-butylphenol, 2-t-butyl-2ethyl-6-t-octylphenol, 2-isobutyl-4-ethyl-5-t-hexylphenol, 2-cyclohexyl-4-n-butyl-6-isopropylphenol, styrene-modified mixed cresol, dl-alpha-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 4,4'-thiobis(4-methyl-6-t-butylphenol), 4,4'-methylene-bis-(2,6-di-t-butylphenol), 2,2'-methylenebis6-(1-methylcyclohexyl)-p-cresol], 2,2'-ethylidenebis(4,6-di-t-butylphenol), 2,2'-butylidenebis(2-t-butyl-4-methylphenol), 1,1,3-tris(2-methyl-4-hydroxy-5-t-butylphenyl)butane, triethylene glycol-bis[3-(3-t-butyl-5-methyl4-hydroxyphenyl)propionate), 1,6-hexanediol-bis[3(3,5-di-t-butyl-4-hydroxyphenyl)propionate], 2,2-thiodiethylenebis3-(3,5-di-t-butyl-4,4-hydroxyphenyl) propionate], N,N'-hexamethylenebis(3.5-di-t-butyl-4,4-hydroxy-hydrocinnamide), 3,5-di-t-butyl-4-hydroxybenzylphosphonate diethyl ester, 1,3,5-tris(2,6-dimethyl-3-hydroxy-4-t-butylbenzyl)isocyanurate, 1,3,5-tris(3,5-di-t-butyl-4-hydroxyphenyl)propionyloxyethyl-)isocyanurae, tris(4-t-butyl-2.6-dimethyl-3-hydroxybenzyl)isocyanurate, 2,4-bis(n-octylthio)-6-(4-hydroxy-3,5- di-t-butylanilino)-1,3,5-triazine, tetrakismethylene-3-(3,5-di-t-butyl-4-hydroxyphenyl)propionate]methane, bis(3,5-di-t-butyl-4-hydroxybenzylphosphonic acid ethyl)calcium, bis(3,5-di-t-butyl-4-hydroxybenzylphosphonic acid ethyl)nickel, bis[3,3-bis(3-t-butyl-4-hydroxyphenyl)butyric acid] glycol ester, N,N'-bis[3-(3,5-di-t-butyl-4-hydroxyphenyl)propionyl)hydrazine, 2,2'-oxamidobis[ethyl3-(3,5-di-t-butyl-4-hydroxyphenyl)-propionate], bis-[2-t-butyl-4-methyl-6-(3-t-butyl-5-methyl-2-hydroxybenzyl)phenyl)terephthalate, 1,3,5-trimethyl-2,4,6tris(3,5-di-t-butyl-4-hydroxybenzyl)benzene, 3,9bis-[1,1-dimethyl-2-(beta-(3-t-butyl-4-hydroxy-5-methylphenyl)propionyloxy)ethyl]-2,4,8,10-tetraoxaspino-[ 5,5)undecane, 2,2-bis[4-(2-(3,5-di-t-butyl-4-hydroxyhydrocinnamoyloxy))ethoxyphenyl]propane, beta-(3,5-di-t-butyl-4-hydroxyphenyl)propionic alkyd ester, etc.

When beta-(3,5-di-t-butyl-4-hydroxyphenyl)propionic acid alkyd ester is used as the phenol type stabilizer, the alkyd ester having 18 or less carbon atoms are particularly preferably used.

Further, a phenol type stabilizer is preferred which has in the molecule the structure represented by

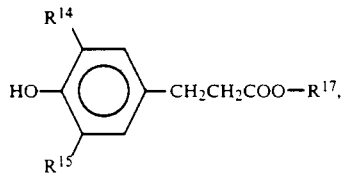

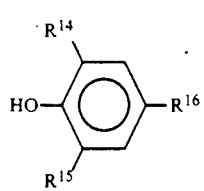

or

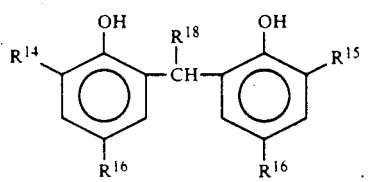

In the above formulae, R$^{18}$ represents a hydrogen atom or an alkyd group having 1 to 6 carbon atoms, R$^{14}$ and R$^{15}$ independently represent alkyl groups having 1 to 6 carbon atoms, R$^{16}$ represents an alkyl group having 1 to 6 carbon atoms or an alkoxy group having 1 to 6 carbon atoms, and R$^{17}$ represents an alkyl group having 1 to 22 carbon atoms or one of the following structures:

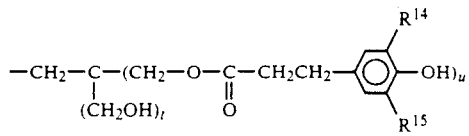

(wherein t and u are numbers of t+u=3 and u=0, 1, 2 or 3),

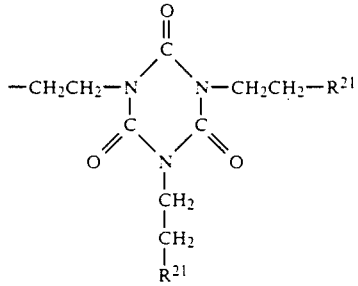

(wherein R$^{21}$ represents:

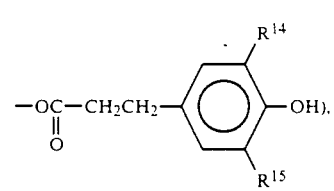

and

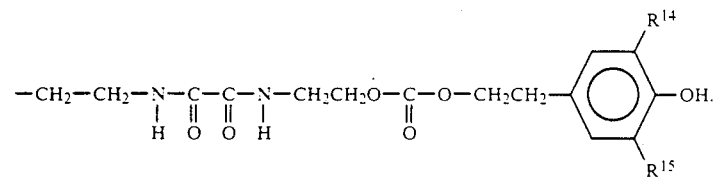

Among them are preferred 2,6-di-tert-butyl-4-methyl-p-cresol, stearyl-beta-(4-hydroxy-3,5-di-tert-butylphenol) propionate, 2,2'-ethylidenebis(3,6-d-tert-butylphenol) and tetrakis[methylene-3-(3,5-di-tert-butyl-4-hydroxyphenyl)propionate]methane.

These phenol type stabilizers can be used alone or as a mixture thereof.

Examples of the phosphite stabilizer include trioctyl phosphite, trilauryl phosphite, tristridecyl phosphite, trisisodecyl phosphite, phenyl diisooctyl phosphite, phenyl diisodecyl phosphite, phenyl di(tridecyl)-phosphite, diphenyl isooctyl phosphite, diphenyl isodecyl phosphite, diphenyl tridecyl phosphite, triphenyl phosphite, tris(nonylphenyl)phosphite, tris-(2,4-di-t-butylphenyl)phosphite, tris(butoxyethyl)phosphite, tetratridecyl-4,4'-butylidenebis(3-methyl6-t-butylphenol)-diphosphite, 4,4'-isopropylidene-diphenol alkyl phosphite (wherein the alkyl has about 12 to 15 carbon atoms), 4,4'-isopropylidenebis(2-t-butylphenol)-di(-nonylphenyl)phosphite, tetra(tridecyl)-1,1,3-tris-(2- methyl-5-t-butyl-4-hydroxyphenyl)butane diphosphite, tetra(tridecyl)-4,4'-butylidenebis(3-methyl-6-t-butylphenol)diphosphite, tris(3,5-di-t-butyl-4-hydroxyphenyl)phosphite, hydrogenated 4,4'-isopropylidenediphenol polyphosphite, bis(octylphenyl) bis4,4'-butylidenebis(3-methyl-6-t-butylphenol)], 1,6-hexanediol diphosphite, hexatridecyl-1,1,3-tris(2-methyl-4-hydroxy-5-t-butylphenol)diphosphite, tris[4,4'-isopropylidenebis(2-t-butylphenol)]phosphite, tris(1,3-distearoyloxyisopropyl)phosphite, 9,10-dihydro-9-phosphaphenanthrene10-oxide, tetrakis(2,4-di-t-butylphenyl)-4,4'-biphenylene diphosphite, etc.

Among them, tris(2,4-di-tert-butylphenyl)phosphite, tris(nonylphenyl)phosphite and tetrakis(2,4-di-tert-butylphenyl)-4,4'-biphenylene diphosphite is particularly preferred.

Further, phosphite type stabilizers of the following formulae, which are derived from pentaerythritol, can also be used:

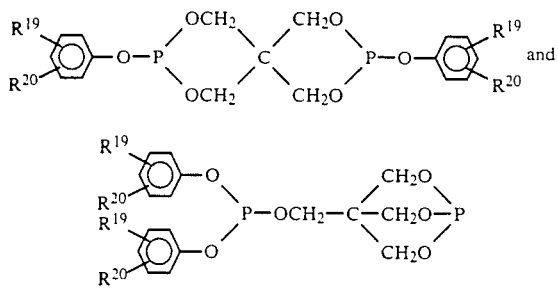

In the above two formulae, R$^{19}$ and R$^{20}$ represent alkyl groups.

The organophosphite stabilizers can be used alone or in combination.

Examples of the higher fatty acid metal salt include alkali, alkaline earth and other metal salts of saturated or unsaturated carboxylic acids having 12 to 40 carbon atoms. Further, the saturated or unsaturated carboxylic acids having 12 to 40 carbon atoms may have substituent(s) such as hydroxyl group(s). Specific examples of the saturated or unsaturated carboxylic acid having 12 to 40 carbon atoms include higher fatty acids such as stearic acid, oleic acid, lauric acid, capric acid, arachidonic acid, palmitic acid, behemic acid, 12-hydroxystearic acid and montanic acid. Further, as metals which form salts by reaction with these higher fatty acids alkaline earth metals such as magnesium, calcium and barium, alkali metals such as sodium, potassium and lithium, cadmium, zinc, lead, etc. can be mentioned Specific examples of the higher fatty acid salt include magnesium stearate, magnesium laurate, magnesium palmitate, calcium stearate, calcium oleate, calcium laurate, barium stearate, barium oleate, barium laurate, barium arachidonate, barium benenate, zinc stearate, zinc oleate, zinc laurate, lithium stearate, sodium stearate, sodium palmitate, sodium laurate, potassium stearate, potassium laurate, calcium 12-hydroxystearate, sodium montanate, calcium montanate, zinc montanate, etc.

Among these higher fatty acid metal salts, zinc salts of saturated fatty acid having 12 to 35 carbon atoms are particularly preferred.

These higher fatty acid metal salts can be used alone or in combination

Compounding rate of the phenol type stabilizer is 0.01 to 10 wt.%, preferably 0.02 to 0.5 wt.%, particularly preferably 0.03 to 0.2 wt.%, compound rate of the organophosphite stabilizer is 0.01 to 1.0 wt.%, preferably 0.02 to 0.5 wt.%, particularly preferably 0.01 to 0.2 wt.%, and compound rate of the higher fatty acid metal salt is 0.01 to 1.0 wt.%, preferably 0.02 to 0.5 wt.%, particularly preferably 0.03 to 0.2 wt.%, based respectively on the molding raw material resin.

This invention is further detailedly described below by examples, but should not be limited thereto.

EXAMPLE 1

Preparation of a titanium catalyst component (A)

Anhydrous magnesium chloride (7.14 kg), 37.5 liters of decane and 35.1 liters of 2-ethylhexyl alcohol were reacted with heating at 140° C. for 4 hours to form a uniform solution. To the solution was added 1.67 kg of phthalic anhydride, and the mixture was stirred at 130° C. for 1 hour with stirring to dissolve phthalic anhydride in the uniform solution.

The resulting uniform solution was cooled to room temperature, and added dropwise to 200 liters of titanium tetrachloride kept at −20° C. over 3 hours. After the addition, the temperature of the mixed solution was elevated to 110° C. over the course of 4 hours. When the temperature reached 110° C., 5.03 liters of diisobutyl phthalate was added.

The mixture was maintained at this temperature for 2 hours with stirring. After the reaction for 2 hours, the solid portion was collected by hot filtration, and resuspended in 275 liters of titanium tetrachloride. The suspension was reacted with heating at 110° C. for 2 hours.

After the reaction, the solid portion was collected by hot filtration and washed with hexane until no free titanium compound was detected in the washings.

The solid titanium catalyst component (A) synthesized by the above process was obtained as a hexane slurry. Part of this catalyst was dried. The dried matter was found by analysis to comprise 2.4 wt.% of titanium, 59 wt.% of chlorine, 18 wt.% of magnesium and 11.6 wt.% of diisobutyl phthalate.

Preliminary polymerization

Purified hexane (100 liters), 3 moles of triethyl aluminum and 1 mole, as titanium atom, of the titanium catalyst component (A) were charged into a nitrogen-purged reactor. Propylene was supplied to the stirred suspension at a velocity of 2,130 Nl/hour over 1.5 hours while the temperature of the suspension was maintained at 15° to 20° C. After completion of propylene supply, the reaction was sealed and polymerization of the residual propylene was allowed to proceed for 30 minutes. 7 Moles of triethyl aluminum, 5 moles of trimethylmethoxysilane and 5.9 kg of 3-methyl-1-butene were added and the mixture was mixed with stirring at 30° C. for 3 hours to preliminary polymerize 3-methyl-1-butene. After completion of the preliminary polymerization, the resulting polymer was adequately washed with purified hexane. Analysis of the polymer revealed that the preliminary polymerization amount of propylene was 2.8 g/g catalyst and that of 3-methyl-1-butene was 2.4 g/g catalyst.

Polymerization

Homopolymerization of propylene was continuously carried out using a 250-liter polymerization reactor. Polymerization pressure and polymerization temperature were controlled at 8 kg/cm²G and 70° C., respectively. As catalyst compounds, 18 mmoles/hour of triethyl aluminum, 1.8 mmoles/hour of dicyclohexyldimethoxysilane and 0.24 mmole in terms of titanium atom.-hour of the preliminary polymerization catalyst wherein propylene and 3-methyl-1-butene had been preliminarily polymerized on the titanium catalyst component (A) were continuously supplied to the reactor. The resulting polypropylene was continuously discharged.

The velocity of polypropylene formation was about 10 kg/hour in average. The content of poly(3-methyl-1-butene) in the polypropylene was 140 wt. ppm.

Production of a biaxially stretched film

One hundred parts by weight of the resulting polypropylene containing poly(3-methyl-1-butene) was mixed with 0.1 part by weight of calcium stearate, 0.1 part by weight of BHT (2,6-di-tertiary butylhydroxytoluene) and 0.1 part by weight of Irganox 1010 (an antioxidant produced by Ciba-Geigy; tetrakis[methylene-3-(3′,5′-di-tertiary butylhydroxyphenyl)propionate]methane) as stabilizers in a Henschel mixer, and then pelletized by an extruder having a cylinder diameter of 65 mm at a kneading temperature of 220° C.

The resulting pellets were extruded at 280° C. by a sheet extruder having a cylinder diameter of 90 mm, and formed into a 1.5 mm thick sheet by a cold roll at 30° C. The sheet obtained was stretched longitudinally at 145° C. to 5 times by a tenter-type consecutive biaxially stretching device, and subsequently stretched transversely to 10 times in a tenter kept at 170° C. to give a biaxially stretched film having a thickness of about 30 microns.

Evaluation of the film

The film obtained in Examples 1 and 2 and Comparative Examples 1 and 2 were evaluated by the following evaluation methods.

(1) See-through property evaluated by visual observation

Five films each having a thickness of 30 microns were stacked, and the light from a fluorescent lamp was viewed through the films. The see-through feeling was evaluated on a scale of 5 grades in which 5 is good and 1 is bad.

(2) Light scattering index (LSI)

Measured by an LSI tester made by Toyo Seiki Co., Ltd.

(3) Haze

Measured in accordance with ASTM D1003.

(4) Diameter of the spherulites

The diameter of spherulites in the cross section of the sheet before biaxial stretching was measured by a stereomicroscope (×100).

As the spherulite size of the sheet is smaller, the biaxially stretched film tends to have better see-through property. Hence, the diameter of the spherulites see-through property.

The results are shown in Table 1.

EXAMPLE 2

Preliminary polymerization

Purified hexane (100 liters), 10 moles of triethyl aluminum, 10 moles of trimethylmethoxysilane, 1 mole, as titanium atom, of the titanium catalyst component (A) and 10 kg of 3-methyl-1-butene were charged into a nitrogen-purged reactor. The resulting suspension was stirred at 20° C. for 3 hours to carry out preliminary polymerization of 3-methyl-1-butene. As a result of analysis, the preliminary polymerization amount of 3-methyl-1-butene was found to be 3.9 g/g catalyst. The stirring was stopped to sediment the solid part and the supernatant was removed. The solid was washed twice with hexane, the whole volume was adjusted to 120 liters, 3 moles of triethyl aluminum was added, and then propylene was supplied at a velocity of 2,130 Nl/hour for 1.5 hours to carry out preliminary polymerization of propylene. Preliminary polymerization temperature was maintained at 15° to 20° C. After completion of the propylene supply, the reactor was sealed and polymerization of the residual propylene was allowed to proceed for 30 minutes, and the resulting polymer was washed twice with hexane. As a result of analysis, the preliminary polymerization amount in terms of propylene was found to be 2.7 g/g catalyst.

Polymerization

Polymerization of propylene was carried out in the same manner as in Example 1. As a result, the poly-(3-methyl-1-butene) content in the formed polypropylene was 220 ppm. A film was prepared and evaluated in the same manner as in Example 1.

Results was shown in Table 1.

COMPARATIVE EXAMPLES 1 AND 2

Procedures of Examples 1 and 2 were repeated except that the propylene prepolymerization was omitted by supplying no propylene. Results are shown in Table 1.

TABLE 1

| | Properties of PP powder | | Properties of the biaxially stretched film | | | | |
|---|---|---|---|---|---|---|---|
| Experimental No. | Apparent bulk density g/ml | Fine powder amount (100 micrometers or less) wt. % | See-through property evaluated by visual observation | LSI % | Haze % | Spherulite diameter of the sheet (microns) | MI g/10 min. |
| Example 1 | 0.46 | 0 | 5 | 1.4 | 0.4 | 5 | 2.7 |
| Comparative Example 1 | 0.21 | 5.6 | — | — | — | — | —* |
| Example 2 | 0.47 | 0 | 5 | 1.2 | 0.4 | 4 | 2.6 |
| Comparative | 0.24 | 4.8 | — | — | — | — | —* |

TABLE 1-continued

|  | Properties of PP powder | | Properties of the biaxially stretched film | | | | |
| --- | --- | --- | --- | --- | --- | --- | --- |
| Experimental No. | Apparent bulk density g/ml | Fine powder amount (100 micrometers or less) wt. % | See-through property evaluated by visual observation | LSI % | Haze % | Spherulite diameter of the sheet (microns) | MI g/10 min. |
| Example 2 | | | | | | | |

*Polymer necessary for film formation could not be obtained because of difficulty of polymerization.

EXAMPLE 3

Preliminary polymerization

Purified hexane (100 liters), 10 moles of triethyl aluminum, 10 moles of trimethylmethoxysilane, 1 mole, as titanium atom, of the titanium catalyst component (A) and 20 kg of 3-methyl-1-butene were charged into a nitrogen-purged reactor. The resulting suspension was stirred at 20° C. for 5 hours to carry out preliminary polymerization of 3-methyl-1-butene. As a result of analysis, the preliminary polymerization amount of the 3-methyl-1-butene polymerization was found to be 7.2 g/g catalyst. The stirring was stopped to sediment the solid part and the supernatant was removed. The solid was washed twice with hexane, the whole volume was adjusted to 120 liters, 3 moles of triethyl aluminum was added, and then propylene was supplied at a velocity of 2,130 Nl/hour for 1.5 hours to carry out preliminary polymerization of propylene. Preliminary polymerization temperature was maintained at 15° to 20° C. After completion of the propylene supply, the reactor was sealed and polymerization of the residual propylene was allowed to proceed for 30 minutes, and the resulting polymer was washed twice with hexane. As a result of analysis, the preliminary polymerization amount of the propylene polymerization unit was found to be 2.7 g/g catalyst.

Polymerization

Polymerization was obtained in an average formation velocity of about 10 kg/hour in the same manner as in the "polymerization" of Example 1. The content of the 3-methyl-1-butene polymerization unit in the polypropylene was 410 wt. ppm and MFR was 6.4 g/10 minutes.

EXAMPLES 4 AND 5

Polypropylenes having a content of the 3-methyl-1-butene polymerization unit of 200 wt. ppm (Example 4) and 630 wt. ppm (Example 5), respectively, were prepared by changing the polypropylene formation rate based on the solid catalyst by adjustment of residence time in Example 3.

Preparation of nonstretched film

One hundred parts by weight of the resulting 3-methyl-1-butene polymer unit-containing composition was mixed with 0.1 part by weight of calcium stearate, 0.1 part by weight of Irganox 1010 [an antioxidant produced by Ciba-Geigy; tetrakis[methylene-3-(3',5'-tertiary butylhydroxyphenyl)propionate]methane), 0.1 part by weight of erucic amide as a stabilizer and 0.1 part by weight of silica (SYLOID 244 ®produced by Fuji-Davison Chemical Ltd.) in a Henschel mixer, and then pelletized by an extruder having a cylinder diameter of 65 mm at a kneading temperature of 220° C.

The resulting pellets were extruded at 240° C. by a T-die film molding device having a cylinder diameter of 65 mm, and then cooled by a cold roll at 30° C. to obtain a nonstretched film having a thickness of 25 microns.

Characteristics of the film was measured and evaluated by the following evaluating method. The results are shown in Table 2.

EXAMPLES 6 AND 7

Propylene and ethylene were randomly copolymerized under the condition of 70° C. and 5 kg/cm$^2$G using the same preliminary polymerization catalyst as in Example 3. The ethylene contents in the resulting copolymer were 3.0 wt.% and 3.2 wt.%, and the contents of the 3-methyl-1-butene polymerization unit were 410 wt. ppm and 220 wt. ppm. The proportions of the nonstretched film obtained in the same manner as in Example 4 are shown in Table 2.

COMPARATIVE EXAMPLES 3 AND 4

Only propylene was preliminarily polymerized in Examples 3 and 4 without preliminarily polymerizing 3-methyl-1-butene. Polymerization was carried out using the thus obtained preliminary polymerization catalyst.

Method of evaluation of the films in Examples 3 to 7 and Comparative Examples 3 and 4

(1) See-through property evaluated by visual observation

Five films each having a thickness of 25 microns were stacked, and the light from a fluorescent lamp was viewed through the films. The see-through feeling was evaluated on a scale of 5 grades in which 5 is good and 1 is bad.

(2) Light scattering index (LSI) and (3) Haze

Measured in the same manner as in Example 1.

(4) Diameter of the spherulites

The diameter of spherulites in the cross section of the sheet was measured by a stereomicroscope (×100).

As the spherulite size is smaller, the see-through property of the film tends to become better. Hence, the diameter of the spherulites was used as a measure for obtaining a film having good see-through property.

(5) Young's modulus

The Young's modulus of the film in the transverse direction was measured by an instron tensile tester at a pulling speed of 50 mm/min. in accordance with JIS K6781.

TABLE 2

| Experimental No. | Polymer | MFR g/10 min. | Content of the 3-methyl-1-butene polymer unit (wt. ppm) | Visual observation | LSI (%) | Haze (%) | Spherulite size (micron) | Young's modulus (kg/cm$^2$) |
|---|---|---|---|---|---|---|---|---|
| Example 3 | Homo (II = 98.2%) | 6.4 | 410 | 5 | 2.4 | 2.8 | 5 | 13,000 |
| Example 4 | Homo (II = 98.3%) | 6.3 | 220 | 4 | 2.8 | 3.0 | 8 | 12,500 |
| Example 5 | Homo (II = 98.3%) | 7.1 | 630 | 5 | 2.2 | 2.7 | 4 | 13,100 |
| Example 6 | Random (C$_2$= = 3.0 wt. %) | 6.6 | 410 | 3 | 3.6 | 2.9 | 25 | 8,000 |
| Example 7 | Random (C$_2$= = 3.2 wt. %) | 7.7 | 220 | 3 | 3.4 | 2.9 | 25 | 7,700 |
| Comparative Example 3 | Homo (II = 98.2%) | 6.6 | 0 | 1 | 5.0 | 2.9 | 35 | 11,000 |
| Comparative Example 4 | Random (C$_2$= = 3.0 wt. %) | 7.3 | 0 | 1 | 4.8 | 2.9 | 50 | 7,500 |

EXAMPLE 8

Polymerization

Random polymerization of propylene and ethylene was continuously carried out using a 250-liter polymerization reactor. Polymerization pressure and polymerization temperature were controlled at 5 kg/cm$^2$G and 70° C., respectively. As catalyst components, 16 mmoles/hour of triethyl aluminum, 1.6 mmoles of dicyclohexyldimethoxysilane and 0.24 mmole in terms of titanium atom/hour of the titanium catalyst component of Example 3 wherein propylene and 3-methyl-1-butene had been preliminarily polymerized were continuously supplied to the reactor. Amount of hydrogen and ethylene to be supplied was adjusted so that the hydrogen/propylene ratio in the gaseous phase might be about 0.07 mole/mole and the ethylene/propylene ratio therein might be about 0.03 mole/mole.

The velocity of formation of the obtained polypropylene was about 6 kg/hour in average.

The MHR of the obtained polypropylene was 7.0 g/10 minutes, the ethylene content thereof was 4.7 mole% and the content of the 3-methyl-1-butene polymerization unit in the polypropylene was 600 wt. ppm.

Preparation of an injection-molded article

One hundred parts by weight of the resulting 3-methyl-1-butene polymerization unit-containing composition was mixed with 0.1 part by weight of calcium stearate and 0.1 part by weight of Irganox 1010 (an antioxidant produced by Ciba-Geigy; terabis[methylene3-(3',5'-di-tertiary butylhydroxyphenyl)propionate]methane) as stabilizers in a Henschel mixer, and then pelletized by an extruder having a cylinder diameter of 65 mm at a kneading temperature of 200° C.

The resulting pellets were injection molded at a resin temperature of 220° C. and an injection die temperature of 50° C. using an injection molding machine having a diameter of 30 mm to obtain a square plate having a thickness of 2 mm.

Characteristics of the square plate were measured and evaluated according to the following evaluation method.

The results are shown in Table 3.

Method of evaluation of the square plate (1) Haze

Measured according to ASTM D1003.

(2) Bending initial elastic modulus

The Young's modulus of the film in the transverse direction was measured by an instron tensile tester at a pulling speed of 50 mm/min. in accordance with JIS K6781.

EXAMPLES 9 AND 10

Polypropylene having a content of the 3-methyl-1-butene polymerization unit of 210 wt. ppm (Example 9) and 420 wt. ppm (Example 10), respectively, were prepared by changing the polypropylene formation rate based on the solid catalyst by adjustment of residence time in Example 1.

COMPARATIVE EXAMPLE 5

The procedures of Example 8 were repeated except that a preliminary polymerization catalyst was prepared by carrying out only the preliminary polymerization of propylene using 3 moles of triethyl aluminum and 1 mole in terms of titanium atom of the titanium catalyst component (A).

TABLE 3

| Experimental No. | MFR g/10 min. | Ethylene content (mole %) | Content of the 3-methyl-1-butene polymer unit (wt. ppm) | Haze (%) | Bending initial elastic modulus (kg/cm$^2$) |
|---|---|---|---|---|---|
| Example 8 | 7.0 | 4.7 | 600 | 36 | 9,400 |
| Example 9 | 7.6 | 4.5 | 210 | 46 | 9,100 |
| Example 10 | 7.2 | 4.4 | 420 | 40 | 9,200 |
| Comparative Example 5 | 7.0 | 4.4 | 0 | 77 | 8,600 |

What is claimed is:

1. An olefin polymerization catalyst component subjected to preliminary polymerization treatment, which is formed by subjecting an olefin polymerization catalyst component (X), which is formed from (A) a solid titanium catalyst component containing magnesium, titanium, halogen and an electron donor as essential ingredients; and which is formed by contacting magnesium compound, electron donor and titanium compound (B) an organoaluminum compound catalyst component, and optionally, (C) an electron donor, to successive preliminary polymerization treatment using each of a straight chain alpha-olefin having 2 to 5 carbon atoms and 3-methyl-1-butene, said component containing 0.1 to 300 g of a polymerization unit of the straight chain alpha-olefin having 2 to 5 carbon atoms and 0.1 to 100 g of a polymerization unit of 3-methyl-1butene, each per g of the solid part of the polymerization catalyst component (X).

2. The olefin polymerization catalyst component of claim 1, which is formed by preliminarily polymerizing the straight chain alpha-olefin having 2 to 5 carbon atoms using the olefin polymerization catalyst component (X) and then preliminarily polymerizing 3-methyl-1-butene using the polymerization catalyst component (X).

3. The olefin polymerization catalyst component of claim 1, which is formed by preliminarily polymerizing 3-methyl-1-butene using the olefin polymerization catalyst component (X) and then preliminarily polymerizing the straight chain alpha-olefin having 2 to 5 carbon atoms using the polymerization catalyst component (X).

4. An olefin polymerization catalyst which is formed to form
(I) the olefin polymerization catalyst component subject to the preliminary polymerization treatment of claim 1,
(II) an organoaluminum compound catalyst component, and
(III) an electron donor.

5. The olefin polymerization catalyst of claim 4 wherein the olefin polymerization catalyst component (I) is formed by preliminarily polymerizing 0.1 to 300 g of the straight chain alpha-olefin having 2 to 5 carbon atoms, per g of the solid part of the polymerization catalyst component (X), and then preliminarily polymerizing 3-methyl-1-butene in an amount of 0.1 to 100 g per g of the solid part of the polymerization catalyst component (X).

6. The olefin polymerization catalyst of claim 4 wherein the olefin polymerization catalyst component (I) is formed by preliminarily polymerizing 3-methyl-1-butene in an amount of 0.1 to 100 g per g of the solid part of the polymerization catalyst component (X), and then preliminarily polymerizing the straight chain alpha-olefin having 2 to 5 carbon atoms in an amount of 0.1 to 300 g per g of the solid part of the polymerization catalyst component (X).

7. The olefin polymerization catalyst component according to claim 1 which contains the polymerization unit of the straight chain alpha-olefin having 2 to 5 carbon atoms in an amount of 1 to 50 g. per g of the solid part of the polymerization catalyst component (X) and the polymerization unit of 3-methyl-1-butene in an amount of 1 to 50 g. per g of the solid part of the polymerization catalyst component (X).

8. The olefin polymerization catalyst component according to claim 7 wherein the solid titanium catalyst component (A) is obtained by contacting from about 0.01 to 5 moles of the electron donor and about 0.01 to 500 moles of the titanium compound. per mole of the magnesium compound.

9. The olefin polymerization catalyst component of claim 8 wherein the atomic ratio of halogen/titanium is from about 4-200/1, the electron donor/titanium mole ratio is about 0.1-10/1 and the magnesium/titanium atomic ratio is from about 1-100/1.

* * * * *